(No Model.)
A. BOND.
DENTAL BRACKET.
No. 531,257. Patented Dec. 18, 1894.
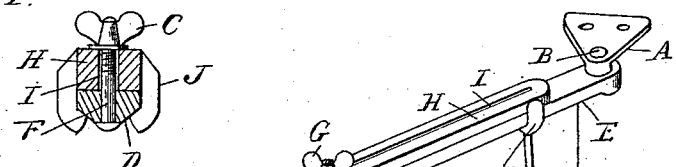
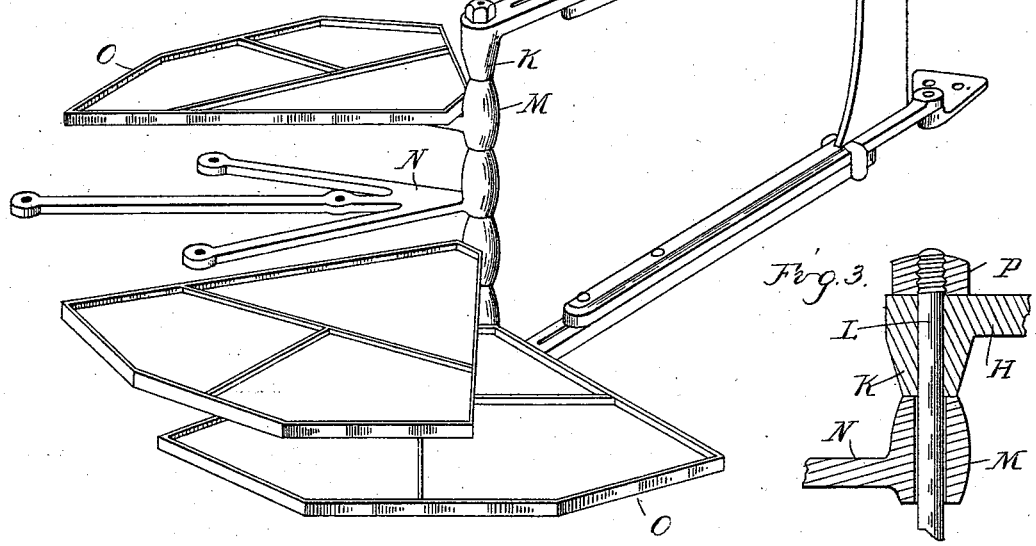
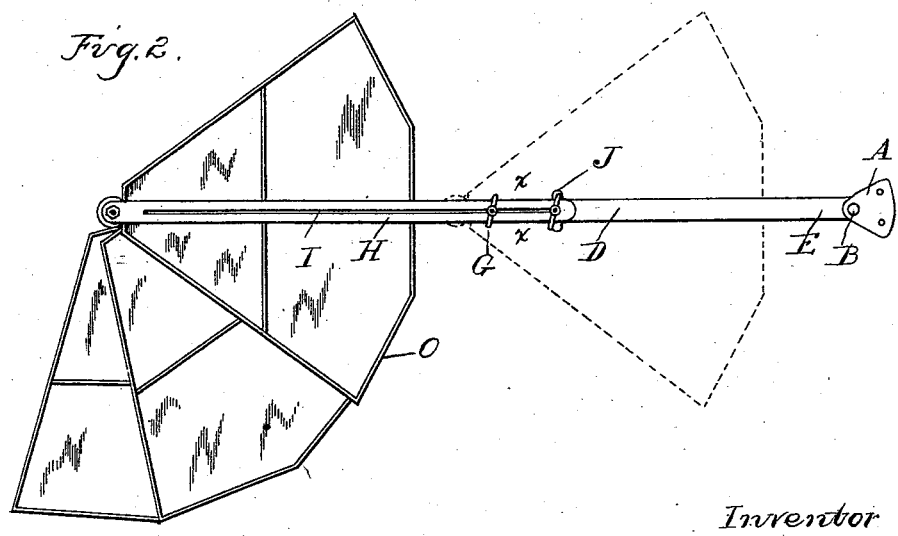
Witnesses
L. J. Whittemore
A. L. Hobby
Inventor
Adam Bond
By Mo. S. Sprague
Attys.

UNITED STATES PATENT OFFICE.

ADAM BOND, OF DETROIT, MICHIGAN.

DENTAL BRACKET.

SPECIFICATION forming part of Letters Patent No. 531,257, dated December 18, 1894.

Application filed June 21, 1894. Serial No. 515,285. (No model.)

*To all whom it may concern:*

Be it known that I, ADAM BOND, a citizen of the United States, residing at Detroit, in the county of Wayne and State of Michigan, have invented certain new and useful Improvements in Dental Brackets, of which the following is a specification, reference being had therein to the accompanying drawings.

This invention consists in the peculiar construction of an adjustably extensible bracket, and the construction of shelf brackets pivoted in the end thereof and adapted to be swung into the bracket or at any desired angle thereto, all as more fully hereinafter described.

In the drawings, Figure 1 is a perspective view of my improved device. Fig. 2 is a top plan view thereof, showing in full and dotted lines the different positions of the parts. Fig. 3 is a section through the pivotal point of the shelves. Fig. 4 is a section on line $x\ x$ Fig. 2.

A are flat plates apertured for screws and having pivot pins B on which the inner ends of the wall section of the bracket are pivoted. This section of the bracket consists of a connecting web C and the parallel arms D at top and bottom of the connecting web, extending upon both sides thereof, the outer extension forming a support for the shelves and the inward extension E forming the means of connection to the hinges. Near the outer end of the outer section of the arms D are the stationary pins F, separated from each other, arranged in line and provided with screw-threaded upper portions to receive the swinging nuts G.

H are sliding extending bars provided with longitudinal slots I through which the pins F engage, the nuts G bearing upon top of the bars. These bars are provided at their inner ends with the over-hanging lugs J which act as guide bearings for such inner ends of the extensions. At the outer end these arms H are provided with an interiorly extending tubular bearing K, through which passes the bolt L, upon which are sleeved the hubs M, between the inner ends of the bearings K. From the hubs M, extend the three armed shelf brackets N on which are supported the substantially triangular shelves O. By means of the nut P, any rattling of the hubs upon the pivotal bolt, may be prevented and all wear taken up.

The parts being thus constructed and the hinges secured to any desired point it is evident that the bracket may be turned to any desired angle to the support and that the shelves may be turned between the arms of the bracket as shown in Fig. 2, or may be turned to any desired angle thereto, outside the arms; also that the extensible section may be adjusted in or out, the bars H sliding on the bars D and bolts F, and when adjusted they may be securely clamped in position to prevent unsteady motion by means of the clamping bolts G. The guide flanges J add materially to the rigidity of the structure in its extended position.

By having the hubs on a single clamping bolt with triangular shelves thereon if the device is desired to be turned up against the wall, the flat edges of the shelves can rest against the wall either in their extended or inner position and thus take up but little room. By having a single clamping bolt L for supporting these shelves in position they may be quickly detached and other devices such as a small set of drawers added in their place without affecting the rest of the structure in any way.

My device is intended especially to give the necessary strength and rigidity to a bracket of this kind with all the desired adjustments without sacrificing its compactness.

What I claim as my invention is—

A dental bracket consisting of two parallel arms, a connecting web between the same located in advance of the rear ends thereof, securing plates pivotally secured to the rear ends of the arms, sliding bars on the arms having elongated slots therein, pins fixed in the arms and projecting through the slots, nuts on the pins engaging the outer faces of the bars, a pivot rod between the outer ends of the bars, shelves on the rod, a nut for compressing the ends of the bars against the shelves, and means rigid on the inner ends of the bars projecting over the inner faces of the arms for retaining the relative position between the bars and arms, substantially as described.

In testimony whereof I affix my signature in presence of two witnesses.

ADAM BOND.

Witnesses:
JAMES WHITTEMORE,
M. B. O'DOGHERTY.